United States Patent
Mori et al.

(10) Patent No.: US 7,567,219 B2
(45) Date of Patent: Jul. 28, 2009

(54) MERCHANDISE MANAGEMENT SYSTEM AND INFORMATION STORAGE MEDIUM

(75) Inventors: Hiroyuki Mori, Tokyo (JP); Hisao Tanabe, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 639 days.

(21) Appl. No.: 11/435,628

(22) Filed: May 17, 2006

(65) Prior Publication Data

US 2006/0282324 A1    Dec. 14, 2006

(30) Foreign Application Priority Data

Jun. 8, 2005    (JP)    ............ P2005-168785

(51) Int. Cl.
*G09G 5/00*    (2006.01)
*G05B 19/00*    (2006.01)

(52) U.S. Cl. ............ 345/1.1; 235/383; 235/385; 705/16; 340/5.91

(58) Field of Classification Search ........... 345/1.1–1.3, 345/204
See application file for complete search history.

(56) References Cited

U.S. PATENT DOCUMENTS

| | | | |
|---|---|---|---|
| 5,493,107 A * | 2/1996 | Gupta et al. | ............... 235/383 |
| 5,751,257 A | 5/1998 | Sutherland | |
| 5,838,286 A * | 11/1998 | Pfeiffer et al. | ............... 345/30 |
| 6,269,342 B1 * | 7/2001 | Brick et al. | ............... 705/20 |
| 6,411,196 B1 * | 6/2002 | Bhyravabhotla | ............ 340/5.91 |
| 6,959,862 B2 * | 11/2005 | Neumark | ............... 235/385 |
| 7,119,759 B2 * | 10/2006 | Zehner et al. | ............... 345/1.1 |
| 2004/0133034 A1 * | 7/2004 | Lemanski et al. | ......... 560/241.1 |

FOREIGN PATENT DOCUMENTS

| | | |
|---|---|---|
| JP | 2002-133519 | 5/2002 |
| JP | 2003-276810 | 10/2003 |
| JP | 2004-35143 | 2/2004 |
| WO | WO 92/05499 | 4/1992 |

* cited by examiner

*Primary Examiner*—Duc Q Dinh
(74) *Attorney, Agent, or Firm*—Ladas & Parry LLP

(57) ABSTRACT

A merchandise management system comprises a shelf tag provided in an exhibit position of a product, and a portable reader/writer for changing a display content on the shelf tag. The shelf tag comprises a display section using an electronic paper, an IC tag, a control section which changes product information based on change information, and controls a displayed status on the shelf tag based on an electrical power signal and the product information, and a receiving section which receives the change information and the electrical power signal from the reader/writer via a radio communication, and outputs the received change information to the changing device, and outputs the received electrical power signal to the controlling device. The reader/writer generates the change information based on a displayed status to be changed, generates the electrical power signal for driving the shelf tag, and transmits it to the shelf tag.

13 Claims, 6 Drawing Sheets

MERCHANDISE MANAGEMENT SYSTEM AND INFORMATION STORAGE MEDIUM

BACKGROUND OF THE INVENTION

1. Field of the Invention

The present invention relates to the field of merchandise management system, and information storage medium and, more particularly, to the field of merchandise management system for managing displayed prices of products for sale or the like in a store comprising multiple product exhibit shelves, and information storage medium on which a control program for the merchandise management system is stored.

2. Description of the Related Art

In recent years, the amount and kind of products to be dealt with in a store such as a grocery store is increasing, while a price of each item is changed frequently (in some cases, a number of times each day) such as when offering a bargain sale under present conditions.

Conventionally, as techniques for managing displayed prices of these products, there are methods, for example, according to the Patent Documents 1 to 3 listed below.

However, these techniques are all based on the assumption that a content of each shelf tag will be rewritten automatically via wireless communication.

[Patent Document 1] Japanese Patent Laid-Open No. 2002-133519

[Patent Document 2] Japanese Patent Laid-Open No. 2003-276810

[Patent Document 3] Japanese Patent Laid-Open No. 2004-035143

The disclosure of Japanese Patent Laid-Open No. 2002-133519 is incorporated by reference in its entirety.

The disclosure of Japanese Patent Laid-Open No. 2003-276810 is incorporated by reference in its entirety. The disclosure of the corresponding US Publication No. 2003182193A1 is also incorporated by reference in its entirety.

The disclosure of Japanese Patent Laid-Open No. 2004-035143 is incorporated by reference in its entirety.

However, in each of the conventional techniques described above, to rewrite the content of the shelf tag, it is necessary to establish radio communications to numerous shelf tags, and then sending/receiving information for rewriting, and therefore, it is necessary to install a high-power transceiver permanently, for example, in a ceiling of the store.

Thus, in such a conventional case, there is a problem that a large engineering work is also needed for installing the transceiver, since its configuration includes the transceiver permanently, and there is another problem that, if in a rented store, the techniques themselves described above can not be used, since it is not allowed to make a hole in the ceiling and so on.

These problems also lead to enormous costs and efforts such as when the store is renovated or the conventional merchandise management system itself is updated, and as a result, there is a problem that, in a store whose scale is not so large, it is impossible to install the conventional merchandise management system as described above.

Therefore, the present invention has been made in view of each problem described above, and an object of the present invention is to provide a merchandise management system, and information storage medium in which a control program for the merchandise management system is stored, wherein the merchandise management system can be easily introduced, and operated, and can centrally manage displayed status on shelf tags corresponding to products traded at the store, even if the store is a relatively small-scale store.

SUMMARY OF THE INVENTION

In order to solve the above problems, the invention of claim 1 relates to a merchandise management system, comprising a display device provided in an exhibit position of a product, and a portable information processing device for changing a display content on the display device, the display device, comprising:

a displaying device which comprises a display medium that retains a displayed status without electrical power, and which displays product information corresponding to the product placed in the exhibit position in which the display device is provided, using the display medium;

a non-volatile storing device which stores at least display device identification information for identifying the display device from other display devices;

a controlling device which controls a change of the displayed status, based on an electrical power signal, and change information for changing the displayed status; and a receiving device which receives the change information and the electrical power signal from the information processing device via radio communication, and outputs the received change information and electrical power signal to the controlling device, the information processing device, comprising:

a change information generating device which generates the change information based on the displayed status to be changed;

an electrical power signal generating device which generates the electrical power signal for driving the controlling device; and a transmitting device which transmits the electrical power signal and the change information generated respectively to the display device, based on the display device identification information corresponding to the display device on which the displayed status is to be changed.

Accordingly, since a displayed status on a displaying device is changed using a portable information processing device, a display content for a display device provided in the exhibit position of each product can be rewritten by a simple and low-cost system without need to build a permanent radio system for changing an indication of each displaying device.

In addition, since product information corresponding to each product is displayed by the displaying device that utilizes a display medium that retains a displayed status without electric power, an operational cost of the merchandise management system itself can be greatly reduced.

In order to solve the above problems, the invention of claim 2 relates to the merchandise management system according to claim 1, wherein the information processing device further comprises:

an identification information reading device which reads the display device identification information from the storing device;

a comparing device which compares the read display device identification information, and display device identification information which is included in the change information, and which indicates the display device for which the displayed status is to be changed, before changing the displayed status; and a comparison result announcing device which announces a comparison result indicating that the read display device identification information, and the display device identification information which indicates the display device for which the displayed status is to be changed are different, if they are different, before changing the displayed status.

Accordingly, when display device identification information which is read at information processing device, and display device identification information which indicates a displaying device on which an displayed status should be changed are different, such result will be announced at the information processing device, so that a user carrying the information processing device can move to the location of the correct display device to change its displayed status.

In order to solve the above problems, the invention of claim 3 relates to the merchandise management system according to claim 1, further comprising a server device comprising:

an indication information generating device which generates status indication information that indicates the displayed status to be changed; and an indication information transmitting device which transmits the generated status indication information to the information processing device, the information processing device, further comprising an indication information receiving device which receives the transmitted status indication information, wherein the change information generating device generates the change information based on the received status indication information.

Accordingly, since change information is generated using status indication information from the server device, and a displayed status on the display device is then changed using the change information, the displayed status of the display device corresponding to each product can be managed centrally at the server device.

In order to solve the above problems, the invention of claim 4 relates to the merchandise management system according to claim 3, wherein the status indication information includes location information which indicates a location in a store of the display device for which the displayed status is to be changed; and the information processing device further comprises a location image displaying device which displays an image of a location that indicates the location based on the location information included in the transmitted status indication information.

Accordingly, since a location in the store of a display device on which a displayed status is to be changed is displayed on the information processing device carried along by a user, the user of the information processing device can arrive at the display device at which the displayed status is needed to be changed without losing one's way.

In order to solve the above problems, the invention of claim 5 relates to the merchandise management system according to claim 3, Wherein the information processing device further comprises:

an identification information reading device which reads the display device identification information from the storing device;

an identification information transmitting device which transmits the read display device identification information to the sever device, before changing the displayed status; and a modification indication information announcing device which announces modification indication information which is transmitted from the server device, and;

the server device further comprises:

a comparing device which compares the transmitted display device identification information, with the display device identification information that indicates the display device for which the displayed status is to be changed; and a modification indication information transmitting device which transmits the modification indication information to the modification indication information announcing device, before changing the displayed status, if the transmitted display device identification information and the display device identification information that indicates the display device for which the displayed status is to be changed are different, wherein the modification indication information indicates that they are different, and includes the display device identification information that indicates the display device for which the displayed status is to be changed.

Accordingly, when display device identification information which is read at an information processing device and display device identification information which indicates a display device at which a displayed status should be changed according to the server device are different, modification indication information which indicates that they are different, and which includes the display device identification information that indicates the display device at which the displayed status should be changed will be announced at the information processing device, so a user carrying the information processing device can move to a location of the correct display device to change its displayed status.

In order to solve the above problems, the invention of claim 6 relates to the merchandise management system according to claim 1, wherein the information processing device further comprises a change status announcing device which announces displayed statuses before and after changing the displayed status respectively in such a way that they are comparable with each other.

Accordingly, since displayed statuses before and after a change are respectively announced on the information processing device in a way that they are comparable with each other, the user carrying the information processing device can change the displayed status correctly while confirming the statuses before and after the change.

In order to solve the above problems, the invention of claim 7 relates to the merchandise management system according to claim 6, wherein the change status announcing device comprises a change status displaying device which displays each of the displayed status before the sending device in the information processing device transmits the electrical power signal and the change information to the display device.

Accordingly, since displayed statuses before and after a change is displayed on the information processing device before a displayed status is actually changed, the actual changing process can be performed after the change of the displayed status is surely confirmed.

In order to solve the above problems, the invention of claim 8 relates to the merchandise management system according to claim 1, wherein the receiving device in the display device, and the sending device in the information processing device send/receive the electrical power signal and the change information, using electromagnetic waves in the same frequency band.

Accordingly, since the electrical power signal and the change information are sent/received using electromagnetic waves in a same frequency band, the structures relating to the sending/receiving performed at each of the display device and the information processing device can be simplified.

In order to solve the above problems, the invention of claim 9 relates to the merchandise management system according to claim 1, wherein the receiving device in the display device, and the sending device in the information processing device send/receive the electrical power signal and the change information, using electromagnetic waves in different frequency bands.

Accordingly, since the electrical power signal and the change information are sent/received using electromagnetic waves in different frequency bands, the electrical power signal and the change information can be surely sent/received without need to consider an effect of an interference or the like.

In order to solve the above problems, the invention of claim 10 relates to the merchandise management system according to claim 1, wherein the display device is one which requires the product information before changing, for changing the displayed status; and the storing device in the display device further stores the product information corresponding to the displayed status before changing.

Accordingly, since the product information corresponding to a displayed status before changing is stored in the storing device, the display device can change the displayed status without functional problems, even if the display device itself needs the product information before being changed in changing the displayed status.

In order to solve the above problems, the invention of claim 11 relates to the merchandise management system according to claim 1, wherein the product information includes product identification information for identifying the product from other products.

Accordingly, since product identification information is included in the product information, the product information can be displayed while each display device clearly express the product to which the display device corresponds.

In order to solve the above problems, the invention of claim 12 relates to the merchandise management system according to claim 11, wherein the controlling device in the display device displays, on the displaying device, a bar-code which indicates the product identified by the product identification information based on the included product identification information.

Accordingly, since a bar-code which indicates a product to which a display device corresponds is displayed on the display device, the bar-code can be read easily, and utilized for various other processes.

In order to solve the above problems, the invention of claim 13 relates to an information storage medium in which a control program for a merchandise management system is stored, wherein the merchandise management system comprises:

a display device provided in an exhibit position of a product, the display device comprising a displaying device which comprises a display medium that retains a displayed status without electrical power, and which displays product information corresponding to the product placed in the exhibit position in which the display device is provided, using the display medium, and a non-volatile storing device which stores at least display device identification information for identifying the display device from other display devices; and a portable information processing device for changing a display content of the display device, wherein the control program controls operations of the display device and the information processing device in the merchandise management system, and comprises:

a display device program which enables a display device computer in the display device to function as:

a controlling device which controls a change of the displayed status based on an electrical power signal, and change information for changing the displayed status; and a receiving device which receives the change information and the electrical power signal from the information processing device via radio communication, and outputs the received change information and electrical power signal to the display device computer functioning as the controlling device, and a processing program which enables a processing computer in the information processing device to function as:

a change information generating device which generates the change information based on the displayed status to be changed an electrical power signal generating device which generates the electrical power signal for driving the display device computer functioning as the controlling device; and a transmitting device which transmits the generated electrical power signal and change information to the display device computer, based on the display device identification information corresponding to the display device for which the displayed status is to be changed, and wherein the display device program and the processing program are stored so that they are readable by the display device computer and the processing computer, respectively.

Accordingly, since a displayed status on a displaying device is changed using a portable information processing device, a display content for a display device provided in the exhibit position of each product can be rewritten by a simple and low-cost system without need to build a permanent radio system for changing an indication of each displaying device.

In addition, since product information corresponding to each product is displayed by the displaying device that utilizes a display medium that retains a displayed status without electric power, an operational cost of the merchandise management system itself can be greatly reduced.

Accordingly, since a displayed status on a displaying device can be changed using a portable information processing device by reading and executing each program by respective computers, the display content for a display device which is provided an exhibit position of each product can be rewritten by a simple and low-cost system without need to build a permanent radio system for changing a display on each of the displaying device.

In addition, since each computer operates in a way that product information corresponding to each product is displayed by the displaying device using a display medium that retains the displayed status without electrical power, an operational cost of a merchandise management system itself can be greatly reduced.

The advantageous effects of the inventions are as follows:

According to the invention described in claim 1, since a displayed status on a displaying device is changed using a portable information processing device, the display content for a display device which is provided in the exhibit position of each product can be written by a simple and low-cost system without need to build a permanent radio system for changing a display on each displaying device.

In addition, since product information corresponding to each product is displayed by the displaying device using a display medium that retains a displayed status without electric power, an operational cost of the merchandise management system itself can be greatly reduced.

Therefore, a merchandise management system which controls a display content of a product on the display device provided in the product exhibit position of the corresponding product can be introduced easily and at a low cost, and a displayed status of a shelf tag corresponding to the product dealt with can be controlled readily even if in a relatively small-scale store.

According to the invention described in the claim 2, in addition to the advantage of the invention described in the claim 1, when a display device identification information read at an information processing device and a display device identification information which indicates a displaying device on which an displayed status should be changed are different, such difference will be announced at the information processing device, so a user carrying the information processing device can move to the location of the correct display device to change its displayed status.

According to the invention described in the claim 3, in addition to the advantage of the invention described in the claim 1, change information is generated using status display information from a server device, and a displayed status on the display device is then changed using the change information, so that the displayed status on the display device corresponding to each product can be managed centrally at the server device.

According to the invention described in the claim 4, in addition to the advantage of the invention described in the claim 3, since a location inside the store of a display device whose displayed statuses to be changed would be displayed on the information processing device carried along by a user, the user of the information processing device can arrive at the display device that needs the change of its displayed status without losing one's way.

According to the invention described in the claim 5, in addition to the advantage of the invention described in the claim 3, when a display device identification information read at an information processing device and a display device identification information which identifies a display device whose displayed status should be changed at the server device are different, modification indication information including the display device identification information which indicates that they are different and indicates the display device whose displayed status should be changed will be announced at the information processing device, so a user carrying the information processing device can move to a location of the correct display device to change its displayed status.

According to the invention described in the claim 6, in addition to the advantage of the invention described in the claim 1, since respective displayed statuses before and after a change are announced on the information processing device in such a way that they are comparable with each other, a user carrying the information processing device can change the displayed status correctly while confirming the before and after change of statuses.

According to the invention described in the claim 7, in addition to the advantage of the invention described in the claim 6, since displayed statuses before and after a change is displayed on the information processing device prior to actually changing a displayed status, the actual changing process can be performed after the change of the displayed status is surely confirmed.

According to the invention described in the claim 8, in addition to the advantage of the invention described in the claim 1, since the electrical power signal and the change information are sent/received using electromagnetic waves in the same frequency band, the structures relating to the sending/receiving for each of the display device and the information processing device can be simplified.

According to the invention described in the claim 9, in addition to the advantage of the invention described in the claim 1, since the electrical power signal and the change information are sent/received using different frequency bands, the electrical power signal and the change information can be surely sent/received without need to consider an effect of an interference or the like.

According to the invention described in the claim 10, in addition to the advantage of the invention described in the claim 1, since the product information corresponding to a displayed status before being changed is stored in the storing device, the display device can change the displayed status, while the product information before being changed is not included in the change information again, and the change information is simplified, even if the display device itself needs the product information before a change of the displayed status. In addition, when displaying again (redisplaying) the product information because of a trouble (for example, secular degradation of a display medium), the product information can be redisplayed using the electric power and an indication signal for redisplaying from the information processing device not via the merchandise management system.

According to the invention described in the claim 11, in addition to the advantage of the invention described in the claim 1, since product identification information is included in the product information, the product information can be displayed while each display device clearly express the product to which the display device corresponds.

According to the invention described in the claim 12, in addition to the advantage of the invention described in the claim 11, since a bar-code which indicates a product to which a display device corresponds is displayed on the display device, the bar-code can be read easily, and utilized for various other processes.

Accordingly, since a displayed status on a displaying device is changed using a portable information processing device, a display content for a display device provided in the exhibit position of each product can be rewritten by a simple and low-cost system without need to build a permanent radio system for changing an indication of each displaying device.

In addition, since product information corresponding to each product is displayed by the displaying device that utilizes a display medium that retains a displayed status without electric power, an operational cost of the merchandise management system itself can be greatly reduced.

Therefore, a merchandise management system which controls a display content of a product on the display device provided in the product exhibit position of the corresponding product can be introduced easily and at a low cost, and a displayed status of a shelf tag corresponding to the product dealt with can be controlled readily even if in a relatively small-scale store.

According to the invention described in the claim 13, since a displayed status on a displaying device can be changed using a portable information processing device by reading and executing each program by respective computers, the display content for a display device which is provided in an exhibit position of each product can be rewritten by a simple and low-cost system without need to build a permanent radio system for changing a display on each of the displaying device.

In addition, since each computer operates in such a way that product information corresponding to each product is displayed by the displaying device using a display medium that retains the displayed status without electrical power, an operational cost of a merchandise management system itself can be greatly reduced.

Therefore, a merchandise management system which controls a display content of a product on the display device provided in the product exhibit position of the corresponding product can be introduced easily and at a low cost, and a displayed status of a shelf tag corresponding to the product dealt with can be controlled readily even if in a relatively small-scale store.

BRIEF DESCRIPTION OF THE DRAWINGS

FIGS. 2A and 2B are configuration diagrams of a shelf tag as a display device included in the merchandise management system according to an embodiment, wherein FIG. 2A is a schematic block diagram of it, and FIG. 2B is an example of its display;

FIGS. 5A and 5B are illustrative indications on the reader/writer in the process of changing of an indication on the shelf tag according to an embodiment, wherein FIG. 5A is an example of an indication for confirming a location, and FIG. 5B is an example of an indication for confirming changes; and FIGS. 6A and 6B are schematic block diagrams of the shelf tag according to a variation, wherein FIG. 6A is a schematic block diagram of the shelf tag according to a first variation, and FIG. 6B is a schematic block diagram of the shelf tag according to a second variation.

DESCRIPTION OF THE PREFERRED EMBODIMENTS

Preferred embodiments for practicing the present invention now will be described with reference to the drawings. Embodiments and variations described below are cases wherein the present invention applies to a merchandise management system which controls displays of shelf tags in a small-scale store such as a so-called convenience store.

(I) Embodiments

At first, embodiments according to the present invention will be described referring to FIG. 1 to FIGS. 5A and 5B.

Figure 1:
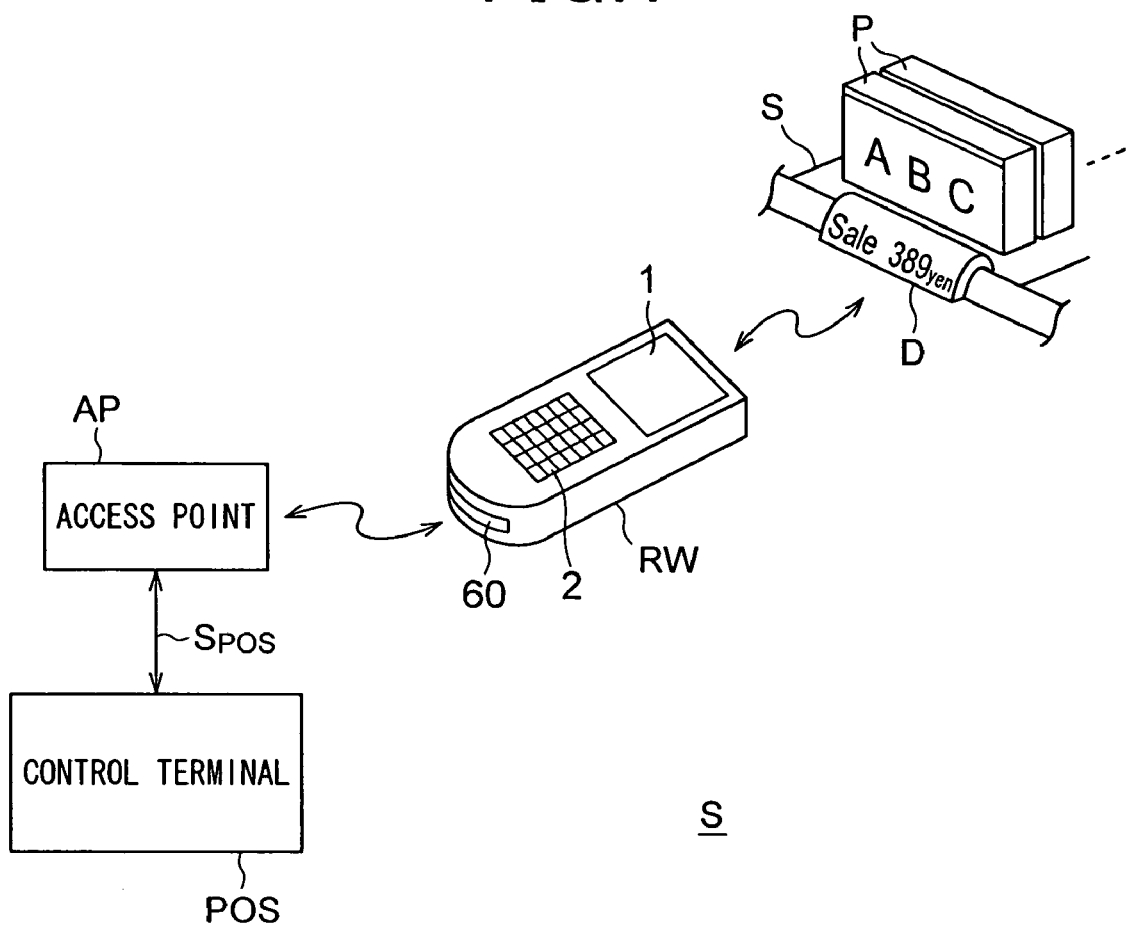
FIG. 1 is a schematic diagram of a merchandise management system according to an embodiment.
Figure 2A:
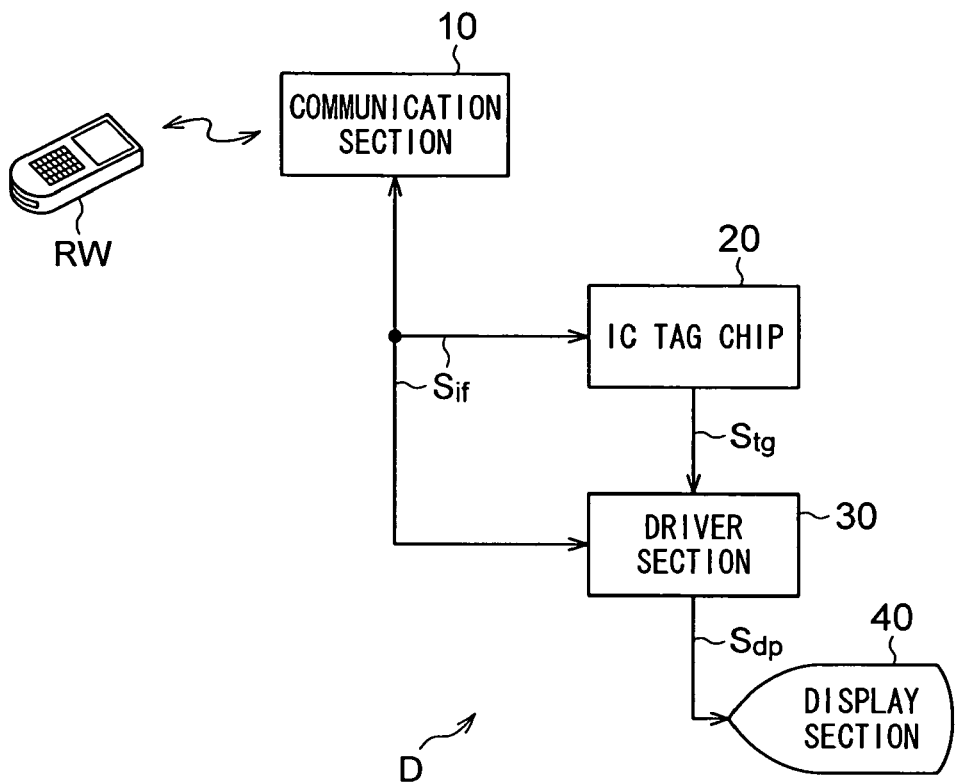
Figure 2B:
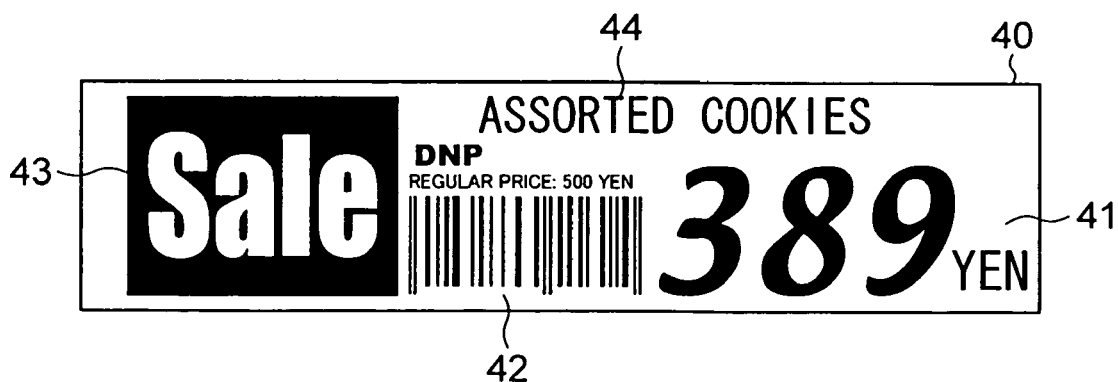
Figure 3:
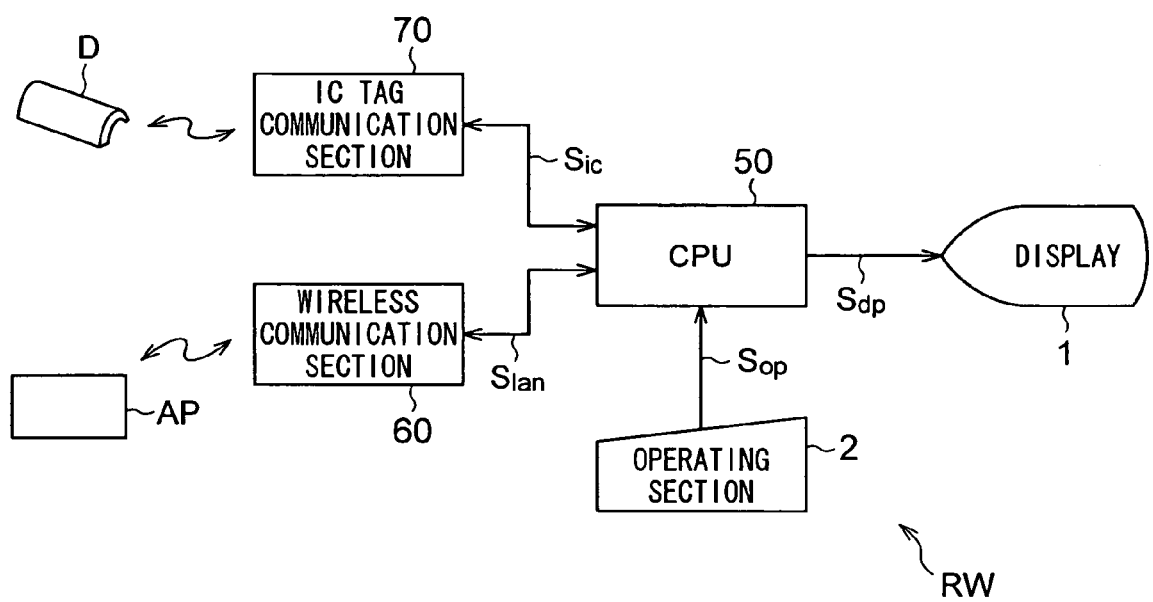
FIG. 3 is a schematic block diagram of a reader/writer included in the merchandise management system according to an embodiment.
Figure 4:
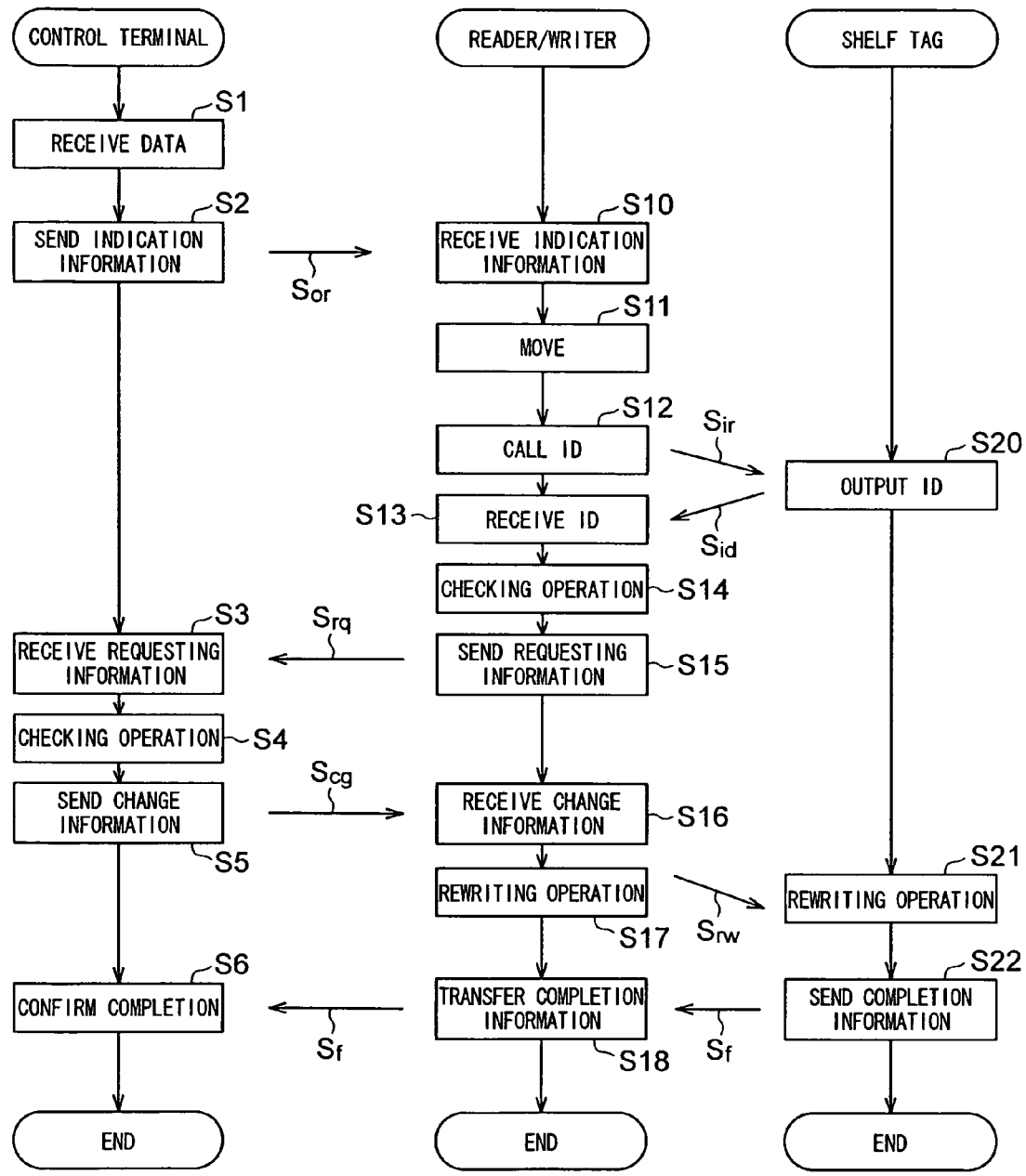
FIG. 4 is a flowchart of a process of changing of an indication on the shelf tag according to an embodiment.
Figure 5A:
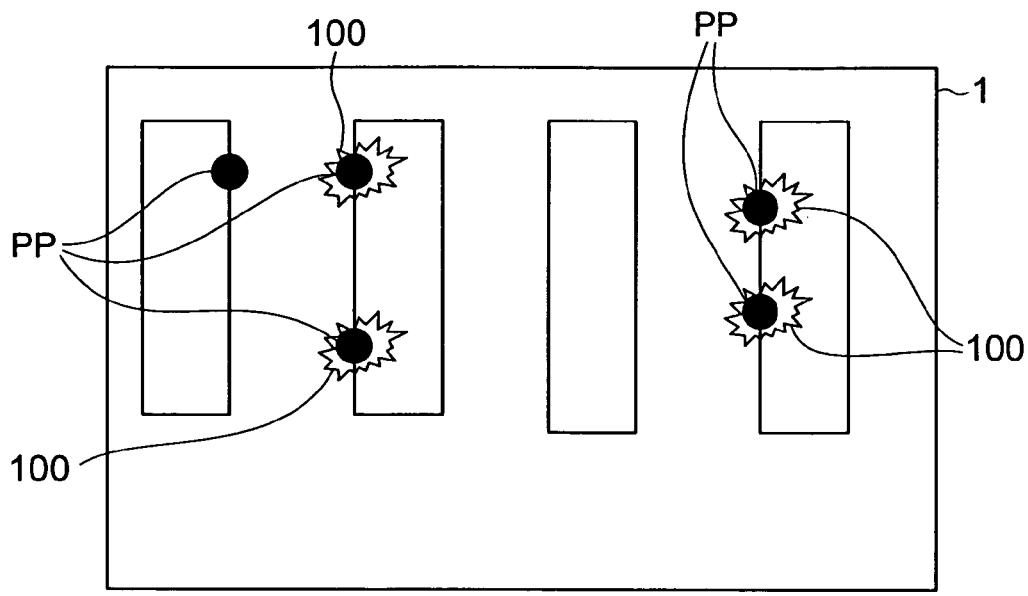
Figure 5B:

FIG. 1 shows a schematic configuration diagram of a merchandise management system according to the embodiment; FIGS. 2A and 2B show a configuration of a shelf tag as a display device included in the merchandise management system; FIG. 3 shows a schematic block diagram of a reader/writer as an information processing device included in the merchandise management system; and FIG. 4 shows a flowchart of a process of changing of an indication of a shelf tag according to the embodiment; and FIGS. 5A and 5B show diagrams that illustrates an indication on the reader/writer in the process for changing.

As showed in FIG. 1, a merchandise management system S according to the embodiment is comprised of a control terminal POS as a server device and an indication information generating device, an access point AP as an indication information transmitting device and a modification indication information transmitting device, a reader/writer RW, and a shelf tag D.

In this configuration, the shelf tag D is provided at a front side of a store shelf S on which products P are placed, and shows a present price and so on for the products P. The shelf tag D comprises a display section 40, as described below, which includes a display medium that retains its displayed status without electrical power (for example, an electronic paper material such as an electrophoretic element having a memory characteristic, an electro-optical element having a memory characteristic, or an electrochromic element having a memory characteristic), and is configured to be able to rewrite its display content based on a control by radio communication from the reader/writer RW.

On the other hand, the control terminal POS is configured as a so-called POS (Point of Sale: information management at the time of sale) terminal, and centrally controls information which indicates names, prices, inventory quantities, expiration date (freshness date for foods), and so on of all products dealt with in a store. In addition, a control terminal POS according to the embodiment gives to, and receives from the reader/writer RW, change information Spos for changing a display content on the shelf tag D using radio communication via the access point AP.

Then, the access point AP which is wirelessly connected to the reader/writer RW via so-called wireless LAN (Local Area Network) or the like, transmits the change information Spos to the reader/writer RW.

Then, the reader/writer RW performs a process for rewriting a display content on the shelf tag D based on the change information Spos obtained via the access point AP. At this time, the reader/writer RW is carried along by a user (in particular, a salesclerk of the store) to a location of the shelf tag D on which the display content is to be changed, and then, radio communicates with the shelf tag D at the location to change the display content.

Now, constructional details of the shelf tag D, from among the constructional elements described above, will be described with referring to FIGS. 2A and 2B.

As shown in FIG. 2A, the shelf tag D according to the embodiment is comprised of a communication section 10 as a receiving device, an IC tag chip 20 as a storing device and a controlling device comprising a so-called IC (Integrated Circuit) tag, a driver section 30 as a controlling device, and a display section 40 as a displaying device.

In this configuration, the communication section 10 communicates wirelessly with the reader/writer RW by RF (Radio Frequency) to give to and receive from the reader/writer, information for controlling a displayed status as the shelf tag D.

On the other hand, the IC tag chip 20 stores identification information which indicates itself (in other words, identification information for identifying from other products, the product P whose price or the like is displayed on the shelf tag D), and outputs the identification information as control information Sif to the communication section 10 or the like, as required. In parallel with this, the IC tag chip 20 outputs control information Stg, which is needed to change the displayed status on the display section 40, to the driver section 30, as required.

When the control information Sif indicating that a price of the product P which is identified by the identification information outputted from the IC tag chip 20 is to be rewritten is transmitted from the reader/writer RW via the communication section 10, the driver section 30 generates a display signal Sdp for changing the displayed status on the display section 40 based on a content of the control information Sif, and outputs the signal to the display section 40.

If the display content of the display section 40 is changed by the display signal Sdp, then the display section 40, which is comprised of the display medium that retains its displayed status without electric power as described above, retains the present displayed status, and keeps to display the display content until the next-time's change of the display content.

Examples of displays on the display section 40 includes at least specific information 43 which is displayed such as when required, name information 44 which indicates a name of the corresponding product P, so-called bar-code information 42 for identifying the product P, and price information 41 which indicates a present price of the product P, as illustrated in FIG. 2B.

Constructional details of the reader/writer RW from among the constructional elements described above will be described here with reference to FIG. 3.

As shown in FIG. 3, the reader/writer RW according to the embodiment is comprised of a CPU 50 as a change information generating device, a comparing device, a comparison result announcing device, an identification information reading device, and an electrical power signal generating device, a radio communication section 60 as an indication information receiving device, an IC tag communication section 70 as a transmitting device, a display 1 as a modification indication information announcing device comprising a liquid crystal display or the like, and an operating section 2 comprising a plurality of operation buttons, dials, or the like.

In this configuration, the radio communication section 60 wirelessly communicates with the access point AP, gives to and receives from it, information that is necessary for changing the display content of the shelf tag D including the change information Spos, and outputs this information as radio information Slan to the CPU 50 as required.

The IC tag communication section 70 wirelessly communicates with the communication section 10 of the shelf tag D by the RF, gives to and receives from it, information that is necessary for changing the display content of the shelf tag D including the identification information stored in the IC tag chip 20, and outputs this information as tag information Sic to the CPU 50 as required.

The CPU 50 mainly handles a process for changing a display according to an embodiment described later, and performs the process for changing based on an operation signal Sop outputted from the operating section 2 according to an operation of the operating section 2 by a user. At this time, information necessary for the process for changing is outputted as the display signal Sdp to the display 1, and displayed on it as required.

A process for changing a display of the shelf tag D according to an embodiment now will be described in more detail with references to FIG. 4 and FIGS. 5A and 5B, which is performed in the merchandise management system S of the embodiment comprising a shelf tag D and a reader/writer. RW which have their respective configurations described above.

In the process for changing, at first, when the data for changing a display is sent from an external line such as a telephone line, a control terminal POS receives the data (step S1), and then, based on the received data, sends indication information Sor to the reader/writer RW via the access point AP (step S2). The indication information Sor includes position information which indicates a position within a store of the shelf tag D on which a display content is to be changed, and identification information which is stored in the IC tag chip 20 in the shelf tag D, and which indicates that the display content of the shelf tag D should be changed.

Then, the reader/writer RW, which receives the indication information Sor via a radio communication section 60 (step S10), displays the position within the store of the shelf tag D on which the display content is to be changed, based on the position information included in the received indication information Sor, for example, as illustrated in FIG. 5A. In the example showed in FIG. 5A, the position of the shelf tag D on which the display content is to be changed is displayed as a position display PP along with a whole layout of store shelves in the store. The position display PP may be blinking 100.

Then, a user who carries the reader/writer RW which displays the position display PP moves to the displayed position in the store with a reference to the display while the reader/writer is kept to be carried along by the user (step S11), and then, call information Sir which calls the identification information from within the IC tag chip 20 in the shelf tag D is transmitted to the shelf tag D (in the indicated position) (step S12).

Thus, the IC tag chip 20 in the shelf tag D reads identification information stored therein, and send it as identification information Sid correspondingly to the call information Sir (step S20), and then, the sent identification information is received at the IC tag communication section 70 of the reader/writer RW (step S13).

Then, the reader/writer RW compares the identification information sent from the control terminal POS (see the steps S2 and S10) with the identification information sent from the shelf tag D (see the steps S20 and S13) to check if their contents are matched with each other (step S14).

In this checking process, when the two identification information is not matched, since it would be concluded that the user had the identification information read from the shelf tag D on which the display content should not be changed, a map within the store such as described in FIG. 5A along with an indication that instructs the user to move is displayed on the display 1 again to move the user to the position of the correct shelf tag D. On the other hand, when the both identification information are matched in the checking process of the step S14, it would be concluded that the user has moved to the correct position at present, and then, requesting information Srq (including the matched identification information Sid) which requests information necessary for rewriting a display content of the shelf tag D is transmitted to the control terminal POS via the access point AP (step S15).

The control terminal POS which receives the requesting information Srq (step S3) checks (verifies) the identification information Sid which requests a change of the display content again to be sure (step S4), generates change information Scg which includes specific changes, and send it to the reader/writer RW again (step S5). At this time, the specific changes comprises, for example, information that indicates a new price, information that indicates whether or not a product is on sale (this information is displayed as the specific information 43), information indicates a new name, and the like.

The checking process of the step S4 may be omitted on condition that the checking process of the step S14 is performed on the reader/writer RW. If a discrepancy between the identification information is detected for the first time in the checking process of step S4, an instruction to move will be transmitted from the control terminal POS to the reader/writer RW.

Then, the reader/writer RW which received the change information Scg (step S16) displays, on the display 1, display contents before and after changing at the shelf tag D whose display content is to be changed, and, in addition, generates display change information Srw for actually changing a display content on display 40 of the shelf tag D based on the change information Scg, and outputs the display change information to the communication section 10 of the shelf tag D together with a driving signal which becomes power for driving the driver section 30 in the shelf tag D. In this case, the display 1 displays, as a display content, as illustrated in FIG. 5B, a display content 101 before a change and a display content 102 after the change, along with an indication such as an arrow 103 which indicates the changing in a position that represents a relation between the display contents before and after the change clearly. Additionally, as illustrated in FIG. 5B, a changed portion may be displayed in a different manner from other displayed portions to clarify the changed portion (for example, tens place of a price in FIG. 5B).

The shelf tag D, which has received the display change information Srw, and drives the driver section 30 by the driving signal included in the received display change information Srw, thereby changing the display content on the display 40 to a content indicated by the display change information Srw (step S21), and generating a completion information Sf which indicates a finish of the change, and sending it to the reader/writer RW (step S22) when the change is completed.

The reader/writer RW, which has received the completion information Sf, further transfers it to the control terminal POS (step S18), and the control terminal POS finally receives the completion information Sf (step S6) so that a series of process of changing of a displayed status is finished.

According to the process of changing of an indication on the shelf tag in accordance with the embodiment described above, since a displayed status on the shelf tag D is changed using the portable reader/writer RW, a display content on the shelf tag D provided in the exhibit position of each product P can be rewritten by a simple and low-cost system without need to build a permanent radio system for changing an indication on each shelf tag D.

In addition, since product information (such as a price) corresponding to each product P is displayed by the shelf tag D which employs a display medium that retains a displayed status without electric power, an operational cost of the merchandise management system S itself can be greatly reduced.

Therefore, a merchandise management system S which controls a display content of a product for the shelf tag D provided in the exhibit position of the corresponding product can be introduced easily and at a low cost, and a displayed status of the shelf tag D corresponding to the product dealt with can be controlled readily even if in a relatively small-scale store.

In addition, since, when identification information read at the reader/writer RW, and identification information which indicates the shelf tag D on which a displayed status should be changed are different, such difference will be announced at the reader/writer RW, a user carrying the reader/writer RW can move to the location of the correct shelf tag D to change its displayed status.

In addition, since change information Srw is generated using indication information Sor from the control terminal POS and the displayed status on the shelf tag D is then changed using the change information Srw, the displayed status on the shelf tag D corresponding to each product P can be controlled centrally at the control terminal POS.

In addition, since a location in the store of the shelf tag D on which a displayed status is to be changed is displayed on the reader/writer RW, the user of the reader/writer RW can arrive at the shelf tag D on which the displayed status is needed to be changed without losing one's way.

In addition, since, when identification information of shelf tag D which is read at the reader/writer RW, and identification information which indicates a shelf tag D on which a displayed status should be changed according to the control terminal POS are different, modification indication information which indicates that they are different, and which includes the identification information that indicates the shelf tag D on which the displayed status should be changed will be displayed on the reader/writer RW (see FIG. 5A), a user carrying the reader/writer RW can move to a location of the correct shelf tag D to change its displayed status.

In addition, since displayed statuses before and after a change are respectively displayed on the reader/writer RW in such a way that they are comparable with each other (see FIG. 5B), the user carrying the reader/writer RW can change the displayed status correctly while confirming the statuses before and after the change.

In addition, since displayed statuses before and after the change are displayed on the reader/writer RW before a displayed status is actually changed, the actual changing process can be performed after the change of the displayed status is surely confirmed.

In addition, since change information Srw which includes a driving signal are sent/received using electromagnetic waves in the same frequency band, the structures relating to the sending/receiving performed at each of the shelf tag D and the reader/writer RW can be simplified.

Furthermore, since bar-code information 42 which indicates a corresponding product P is displayed in product information, the bar-code information can be read easily, and utilized for various other processes.

(II) Variations

Variations of the present invention here will be described with references to FIG. 6A and FIG. 6B.

Figure 6A:
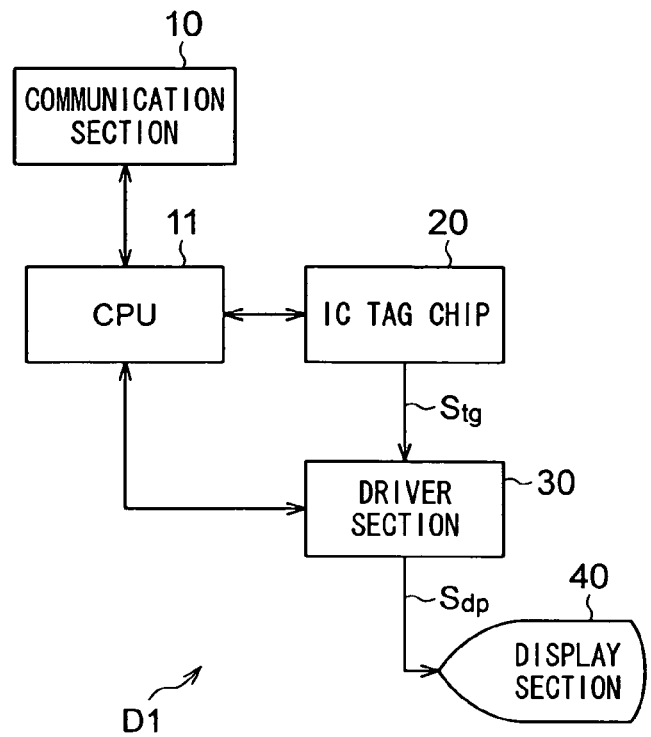
Figure 6B:
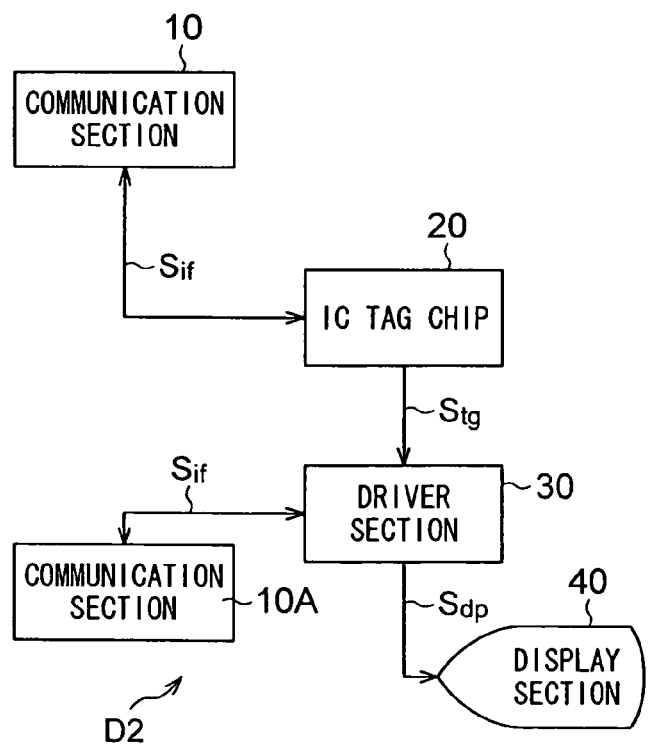

FIG. 6A and FIG. 6B are block diagrams which show schematic configurations of reader/writers according to the variations. In FIG. 6A and FIG. 6B, the same members as component members of the shelf tag D in the embodiments are numbered with numbers of corresponding members respectively, and their detail descriptions are omitted.

While, in the above first embodiment, the driving signal which is a driving source to change a display content of the shelf tag D, and the change information Srw which indicates such changes specifically are sent/received using electromagnetic waves in the same radio frequency band, in a first variation, CPU 11 which acts on a processing instruction from a communication section 10 may be further provided in a shelf tag D1 to reduce noise and clearly separate both of them as shown in FIG. 6A.

In a second variation, as shown in FIG. 6B, the driving signal which is the driving source to change a display content of the shelf tag D, and the change information Srw which indicates such changes specifically may be sent/received separately using electromagnetic waves in respective radio frequency bands which are different from each other. In this case, a communication section 10A (dedicated to sending/receiving of driving signals) separate from the communication section 10 (dedicated to sending/receiving of change information Srw) is provided in a shelf tag D2.

According to the second variation, since the driving signal and the change information Srw are sent/received using electromagnetic waves in different frequency bands, the driving signal and the change information Srw can be surely sent/received without need to consider an effect of an interference or the like.

Additionally, according to the third variation, the function of CPU 11 such as illustrated in FIG. 6A can be included in any one of the IC tag chip 20 or the driver section 30. In this case, one of the IC tag chip 20 or the driver section 30 in which the function of CPU 11 is included is electrically connected to the other. In this configuration, when the function of CPU 11 is included in the driver section 30, for example, the driving signal and the change information Srw are sent from a portion that functions as the CPU 11, to the IC tag chip 20.

According to a third variation, since the driving signal and the change information Srw are supplied to, for example, the IC tag chip 20 by a portion that functions as the CPU 11, the IC tag chip 20 does not need to wirelessly communicate with an outside so that a frequency band other than those used regularly as the IC chip tag 20 can be used for another purpose.

Although a case has been described in which the information is given to and received from the control terminal POS to change an indication on the shelf tag D in the embodiments and variations described above, the information may be given to and received from a register device placed on a cash desk in the store alternatively so that the indication information which instructs to change an indication on the shelf tag D can be sent from the register device.

Although a case has been described in which, in changing a displayed status on the display section 40 of the shelf tag D, it is able to be changed only by the change information Scg in the embodiments and variations described above, product information which includes the price information 41 and the like may be stored in the IC tag chip 20 when the display portion 40 that needs the price information 41 and the like corresponding to a displayed status before a changing because of a characteristics of the display portion 40 according to the present invention is used.

A general-purpose computer can be utilized as the control terminal POS, the CPU 50 in the reader/writer RW, or the IC tag chip 20 in the shelf tag D of the present embodiment by storing a program corresponding to the flow chart shown in FIG. 4 in an information storage medium such as rewritable removable memory device (for example, flexible disk, solid semiconductor memory) or a hard disk, or acquiring and storing it via Internet, and reading and executing it by the general-purpose computer.

Along with the advantages of the present invention mentioned above, the following advantages are derived:

a) A change content can be confirmed on that site, since an indication of the shelf tag D is updated before user's (salesclerk's) eyes;

b) A work of change (and check) of the display content can be performed at the same time of a work such as inventory control or replenishment of products;

c) A work of checking a stock of actual goods can be performed on the occasion of changing displayed information so that its result can be collated with data in the control terminal POS or a sales information management data;

d) In the small-scale store, since an area of the store and the number of products itself is small, the number of products to be changed and a frequency of change are limited. Therefore, when a user (salesclerk) does works (for changes) in front of a store shelf on which a display content should be changed, the change of displayed information can be done quickly and surely;

e) Cooperation with a conventional POS system is enabled easily.

As described above, the present invention can be applied to the field of merchandise management for a store, and prominent advantages of the present invention is obtained, in particular, when it is specifically applied to the field of merchandise management for a small-scale store.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

The entire disclosure of Japanese Patent Application No. 2005-168785 filed on Jun. 8, 2005 including the specification, claims, drawings and summary is incorporated herein by reference in its entirety.

What is claimed is:

1. A merchandise management system, comprising a display device provided in an exhibit position of a product, and a portable information processing device for changing a display content on the display device, the display device, comprising:

a displaying device which comprises a display medium that retains a displayed status without electrical power, and which displays product information corresponding to the product placed in the exhibit position in which the display device is provided, using the display medium;

a non-volatile storing device which stores at least display device identification information for identifying the display device from other display devices;

a controlling device which controls a change of the displayed status, based on an electrical power signal, and change information for changing the displayed status; and a receiving device which receives the change information and the electrical power signal from the information processing device via radio communication, and outputs the received change information and electrical power signal to the controlling device, the information processing device, comprising:

a change information generating device which generates the change information based on the displayed status to be changed;

an electrical power signal generating device which generates the electrical power signal for driving the controlling device; and a transmitting device which transmits the electrical power signal and the change information generated respectively to the display device, based on the display device identification information corresponding to the display device on which the displayed status is to be changed.

2. The merchandise management system according to claim 1, wherein the information processing device further comprises:

an identification information reading device which reads the display device identification information from the storing device;

a comparing device which compares the read display device identification information, and display device identification information which is included in the change information, and which indicates the display device for which the displayed status is to be changed, before changing the displayed status; and a comparison result announcing device which announces a comparison result indicating that the read display device identification information, and the display device identification information which indicates the display device for which the displayed status is to be changed are different, if they are different, before changing the displayed status.

3. The merchandise management system according to claim 1,
further comprising a server device comprising:
an indication information generating device which generates status indication information that indicates the displayed status to be changed; and
an indication information transmitting device which transmits the generated status indication information to the information processing device,
the information processing device, further comprising an indication information receiving device which receives the transmitted status indication information,
wherein the change information generating device generates the change information based on the received status indication information.

4. The merchandise management system according to claim 3,
wherein the status indication information includes location information which indicates a location in a store of the display device for which the displayed status is to be changed; and
the information processing device further comprises a location image displaying device which displays an image of a location that indicates the location based on the location information included in the transmitted status indication information.

5. The merchandise management system according to claim 3,
wherein the information processing device further comprises:
an identification information reading device which reads the display device identification information from the storing device;
an identification information transmitting device which transmits the read display device identification information to the sever device, before changing the displayed status; and
a modification indication information announcing device which announces modification indication information which is transmitted from the server device, and;
the server device further comprises:
a comparing device which compares the transmitted display device identification information, with the display device identification information that indicates the display device for which the displayed status is to be changed; and
a modification indication information transmitting device which transmits the modification indication information to the modification indication information announcing device, before changing the displayed status, if the transmitted display device identification information and the display device identification information that indicates the display device for which the displayed status is to be changed are different, wherein the modification indication information indicates that they are different, and includes the display device identification information that indicates the display device for which the displayed status is to be changed.

6. The merchandise management system according to claim 1,
wherein the information processing device further comprises a change status announcing device which announces displayed statuses before and after changing the displayed status respectively in such a way that they are comparable with each other.

7. The merchandise management system according to claim 6,
wherein the change status announcing device comprises a change status displaying device which displays each of the displayed status before the sending device in the information processing device transmits the electrical power signal and the change information to the display device.

8. The merchandise management system according to claim 1,
wherein the receiving device in the display device, and the sending device in the information processing device send/receive the electrical power signal and the change information, using electromagnetic waves in the same frequency band.

9. The merchandise management system according to claim 1,
wherein the receiving device in the display device, and the sending device in the information processing device send/receive the electrical power signal and the change information, using electromagnetic waves in different frequency bands.

10. The merchandise management system according to claim 1,
wherein the display device is one which requires the product information before changing, for changing the displayed status; and
the storing device in the display device further stores the product information corresponding to the displayed status before changing.

11. The merchandise management system according to claim 1,
wherein the product information includes product identification information for identifying the product from other products.

12. The merchandise management system according to claim 11,
wherein the controlling device in the display device displays, on the displaying device, a bar-code which indicates the product identified by the product identification information based on the included product identification information.

13. An information storage medium in which a control program for
a merchandise management system is stored,
wherein the merchandise management system comprises:
a display device provided in an exhibit position of a product, the display device comprising a displaying device which comprises a display medium that retains a displayed status without electrical power, and which displays product information corresponding to the product placed in the exhibit position in which the display device is provided, using the display medium, and a non-volatile storing device which stores at least display device identification information for identifying the display device from other display devices; and
a portable information processing device for changing a display content of the display device,
wherein the control program controls operations of the display device and the information processing device in the merchandise management system, and comprises:
a display device program which enables a display device computer in the display device to function as:

a controlling device which controls a change of the displayed status based on an electrical power signal, and change information for changing the displayed status; and a receiving device which receives the change information and the electrical power signal from the information processing device via radio communication, and outputs the received change information and electrical power signal to the display device computer functioning as the controlling device, and a processing program which enables a processing computer in the information processing device to function as:

a change information generating device which generates the change information based on the displayed status to be changed an electrical power signal generating device which generates the electrical power signal for driving the display device computer functioning as the controlling device; and a transmitting device which transmits the generated electrical power signal and change information to the display device computer, based on the display device identification information corresponding to the display device for which the displayed status is to be changed, and wherein the display device program and the processing program are stored so that they are readable by the display device computer and the processing computer, respectively.

* * * * *